(12) United States Patent  (10) Patent No.: US 9,576,337 B2
Yim  (45) Date of Patent: Feb. 21, 2017

(54) IMAGE PROCESSING APPARATUS AND CONTROL METHOD THEREOF

(71) Applicant: SAMSUNG ELECTRONICS CO., LTD., Suwon-si (KR)

(72) Inventor: Dale Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/807,268

(22) Filed: Jul. 23, 2015

(65) Prior Publication Data

US 2016/0086302 A1 Mar. 24, 2016

(30) Foreign Application Priority Data

Sep. 18, 2014 (KR) .................. 10-2014-0124241

(51) Int. Cl.
  *G06K 9/40* (2006.01)
  *G06T 3/40* (2006.01)
  *G09G 5/391* (2006.01)

(52) U.S. Cl.
  CPC .............. *G06T 3/40* (2013.01); *G09G 5/391* (2013.01)

(58) Field of Classification Search
  CPC ............ G06K 9/40; G06K 9/44; G06T 1/20; G06T 3/40; G06T 5/00; G06T 5/002; G06T 5/003; G06T 5/007; G06T 5/009; G06T 5/40; G06T 5/50; G06T 7/0081; G06T 7/408; G06T 9/00; G06T 2207/10094;G06T 2207/20012; G06T 2207/20028; G06T 2207/20192; G06T 2207/20208; G06T 2207/20216; G06T 2207/20004–2207/20032; G06T 2207/2019–2207/20221; G06T 3/0012–3/0025; G06T 2210/36; G06F 17/30256; H04N 1/58; H04N 1/60; H04N 5/142; H04N 5/21; G09G 5/391
  See application file for complete search history.

(56) References Cited

U.S. PATENT DOCUMENTS

| | | | | |
|---|---|---|---|---|
| 6,577,762 | B1 * | 6/2003 | Seeger | G06K 9/38 382/173 |
| 7,082,218 | B2 * | 7/2006 | Pollard | H04N 1/58 382/167 |
| 7,889,958 | B2 * | 2/2011 | Yamada | G02B 6/43 385/129 |
| 8,639,050 | B2 * | 1/2014 | Gupta | G06T 5/002 348/607 |
| 9,237,257 | B1 * | 1/2016 | Szedo | H04N 5/142 |

* cited by examiner

*Primary Examiner* — Jose Couso
(74) *Attorney, Agent, or Firm* — Sughrue Mion, PLLC

(57) ABSTRACT

An image processing apparatus is provided. The image processing apparatus includes an image quality processor and a controller. The image quality processor performs a detail enhancement function on an image frame. The controller calculates blur information and/or gray information of the image frame and controls the image quality processor to perform the detail enhancement function on the image frame based on the calculated information.

16 Claims, 4 Drawing Sheets

IMAGE PROCESSING APPARATUS AND CONTROL METHOD THEREOF

CROSS-REFERENCE TO RELATED APPLICATION

This application claims priority from Korean Patent Application No. 10-2014-0124241, filed on Sep. 18, 2014, in the Korean Intellectual Property Office, the disclosure of which is incorporated by reference herein in its entirety.

BACKGROUND

1. Field

Apparatuses and methods consistent with exemplary embodiments relate to an image processing apparatus and a control method thereof, and more particularly, to an image processing apparatus and a control method thereof which are capable of reducing power consumption using an image quality processing function.

2. Description of the Related Art

Due to the development of electronic technology, ultra-high performance electronic apparatuses are emerging. In recent years, with the needs of users for viewing realistic images in various types of display apparatuses such as televisions (TVs), high definition display apparatuses capable of displaying images with high resolution of ultra-high definition (UHD) or greater resolution have been developed.

However, there is a disadvantage in that considerable power is consumed to display a high definition image in a high definition display apparatus.

SUMMARY

Exemplary embodiments may overcome the above disadvantages and other disadvantages not described above. Also, an exemplary embodiment is not required to overcome the disadvantages described above, and an exemplary embodiment may not overcome any of the disadvantages described above.

According to an aspect of an exemplary embodiment, there is provided an image processing apparatus including an image quality processor configured to perform a detail enhancement function on an image frame; and a controller configured to calculate at least one of blur information and gray information of the image frame and control the image quality processor to perform the detail enhancement function on the image frame based on the calculated information.

The controller may calculate the blur information of the image frame using at least one of an edge characteristic value and a high frequency characteristic value of the image frame, and may calculate the gray information of the image frame using pixel values included in a certain region of the image frame.

The controller may determine that no detail enhancement function is to be performed in response to the calculated blur information being equal to or less than a threshold value or in response to the calculated gray information being equal to a specific value.

The image quality processor may include a scaler configured to perform scaling on the image frame; and a detail generator configured to generate a detail added to the image frame scaled through the scaler.

The image quality processor may further include a switch configured to turn on/off at least one of an input and an output of the detail generator, and the controller controls the switch to turn off the input and/or output of the detail generator in response to a determination that no detail enhancement function is to be performed.

The image quality processor may be at least one of a luminance processor configured to perform the detail enhancement function on luminance of the image frame and a chroma processor configured to perform the detail enhancement function on chroma of the image frame.

The controller may determine whether or not to perform the detail enhancement function using at least one of blur information and gray information for a plurality of image frames.

The controller may determine whether or not to perform the detail enhancement function using the gray information calculated in at least one of a YCbCr color space and a RGB color space.

The controller may determine that no detail enhancement function is to be performed once per a certain number of image frames, in response to the calculated blur information being more than the threshold value and the calculated gray information not being equal to the specific value.

According to an aspect of an exemplary embodiment, there is provided a method of controlling an image processing apparatus, the method comprising calculating at least one of blur information and gray information of an image frame; determining whether or not to perform a detail enhancement function on the image frame based on the calculated information; and performing the detail enhancement function on the image frame based on a result of the determination.

The calculating may include calculating the blur information of the image frame using at least one of an edge characteristic value and a high frequency characteristic value of the image frame, and/or calculating the gray information of the image frame using pixel values included in a certain region of the image frame.

The determining may include determining that no detail enhancement function is to be performed in response to the calculated blur information being equal to or less than a threshold value or in response to the calculated gray information being equal to a specific value.

The performing may include, in response to a determination that the detail enhancement function is to be performed, performing scaling on the image frame and performing the detail enhancement function by generating a detail to be added to the scaled image frame and adding the detail to the scaled image frame.

In response to a determination that no detail enhancement function is performed, there may be generated no detail to be added to the scaled image frame.

The detail enhancement function may be at least one of a detail enhancement function on luminance of the image frame and a detail enhancement function on chroma of the image frame.

The calculating may include calculating at least one of blur information and gray information for a plurality of image frames, and the determining includes determining whether or not to perform the detail enhancement function using the at least one of the calculated blur information and gray information for the plurality of image frames.

The determining may include determining whether or not to perform the detail enhancement function using the gray information calculated in at least one of a YCbCr color space and a RGB color space.

In response to the calculated blur information being greater than the threshold value and the calculated gray information not being equal to the specific value, it may be determined that no detail enhancement function is to be performed once per a certain number of image frames.

The controller may be configured to determine to perform the detail enhancement function when the blur information is greater than a threshold value; determine not to perform the detail enhancement function when the blur information is less than or equal to the threshold value; and control the image quality processor to add detail information when it is determined to perform the detail enhancement function, and to not add detail information when it is determined not to perform the detail enhancement function.

The controller may be configured to determine to perform the detail enhancement function when the gray information is not equal to a specific value; determine not to perform the detail enhancement function when the gray information is equal to the specific value; and control the image quality processor to add detail information when it is determined to perform the detail enhancement function, and to not add detail information when it is determined not to perform the detail enhancement function.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
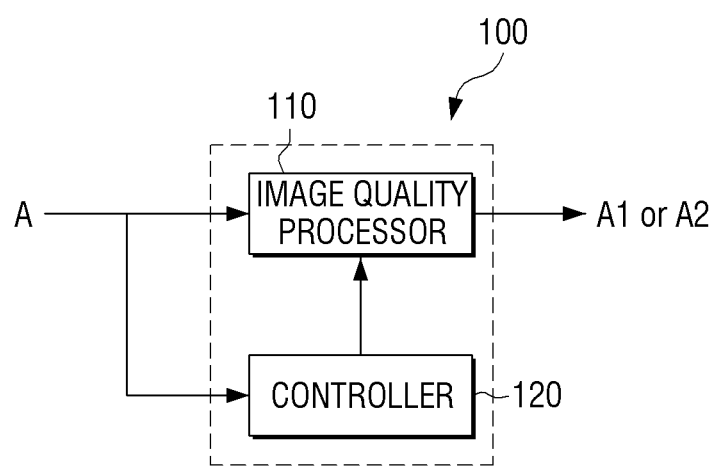
FIG. 1 is a block diagram illustrating a configuration of an image processing apparatus according to an exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

In response to a source image having a lower resolution than a resolution supported in a corresponding display apparatus being input, a display apparatus may display the low resolution image with a high resolution. The sharp image with high definition may be displayed through a method of generating detail, adding the generated detail to the scaled image, and the like other than a method of simply performing scaling on an input image. That is, since the operation of generating the detail, adding the detail to the scaled image, and the like is further employed to display the high definition image, the power consumption is more increased than in a general display operation.

A method of reducing power consumption would thus be advantageous in high definition display apparatuses with large scale. One method of reducing power consumption is to turn the entire screen off such that the screen is not viewed by the user. However, it would be advantageous to reduce power consumption while the user views the displayed screen by the user turning off the screen only in response to the image quality processing function of the display apparatus being used.

FIG. 1 is a block diagram illustrating a configuration of an image processing apparatus according to an exemplary embodiment. Referring to FIG. 1, an image processing apparatus 100 may include an image quality processor 110 and a controller 120.

The image quality processor 110 may process an image input to the image processing apparatus 100. In response to an image frame being input, the image quality processor 110 may perform a detail enhancement function on the input image frame in order to produce an image of high quality. Specifically, the image quality processor 110 may perform scaling on the input image frame and perform the detail enhancement function on the image frame by generating a detail to be added to the scaled image frame and adding the generated detail to the scaled image frame. For example, the detail may be a pixel value added to the scaled image in response to scaling a low resolution image to a high resolution image being performed, but this is not limited thereto.

In this example, the image quality processor 110 may perform at least one of the detail enhancement function for luminance of the input image frame and the detail enhancement function for chroma of the input image frame.

The controller 120 may control an overall operation of the image processing apparatus 100. In particular, the controller 120 may calculate at least one of blur information and gray information of the image frame by analyzing the image frame, and determine whether or not to perform the detail enhancement function based on the at least one of the calculated blur information and gray information, and control the image quality processor 110 to perform the detail enhancement function on the image frame based on the determination result.

As an example, the controller 120 may calculate the blur information and gray information of the image frame by analyzing the image frame input to the image quality processor 110. As another example, the controller 120 may calculate the blur information of the image frame using at least one of an edge characteristic value and high frequency characteristic value of the image frame, and calculate the gray information of the image frame using pixel values included in a certain region of the image frame. The certain region may be preset. In the above examples, the blur information refers to a blur level of a corresponding image frame, and the gray information refers to a low chroma level of the corresponding image frame.

The controller 120 may calculate the blur information and the gray information every image frame. In response to the gray information being acquired, the controller 1120 may calculate the gray information using pixel values in the YCrCb color space and the RGB color space of the image frame.

The controller 120 may determine whether or not to perform the detail enhancement function based on the at least one of the calculated blur information and gray information.

To be specific, in response to the calculated blur information being equal to or less than a threshold value or the calculated information being a specific value, the controller 120 may determine that the detail enhancement function is not to be performed. The threshold value and the specific value may each be preset, or may be determined experimentally.

That is, the blur information refers to a blur level of a corresponding image frame. Therefore, in response to the blur information being equal to or less than the threshold value, the blur level of the corresponding image frame is high, and thus the detail enhancement effect would be insignificant if the detail enhancement function were to be performed. Accordingly, the controller 120 may determine that the detail enhancement function is not to be performed.

The gray information indicates how low a chroma level of the corresponding image frame is. Therefore, in response to the specific value being set to a value at which the detail enhancement effect would be insignificant due to low chroma if the detail enhancement function were to be performed, the controller 120 may determine that no detail enhancement function is to be performed.

In response to a case in which the calculated blur information is more than the threshold value and the gray information being not the specific value, the controller 120 may determine that the detail enhancement function is performed.

The controller 120 may control the image quality processor 110 to perform the detail enhancement function according to the determination of whether or not to perform the detail enhancement function. In response to a determination that no detail enhancement function is performed, the controller 120 may control the image quality processor 110 not to generate the detail to be added to the scaled image frame. The detailed method of controlling the image quality processor 110 not to generate the detail to be added to the image frame in the controller 120 will be described in detail with reference to FIG. 2 later.

On the other hand, in response to a determination that the detail enhancement function is to be performed, the controller 120 may control the image quality processor 110 to perform scaling on the image frame, generate the detail to be added to the scaled image frame, add the generated detail to the scaled image frame, and output the detail-added image frame.

In some exemplary embodiments, even in response to the calculated blur information being more than the threshold value and the calculated gray information not being the specific value, that is, even in response to a determination that the detail enhancement function is to be performed according to the blur information and the gray information, the controller 120 may determine that the detail enhancement function is not performed once per a certain number of image frames. The certain number of image frames may be preset. In other words, in some exemplary embodiments, the controller 120 may control the image quality processor 110 to perform the detail enhancement function on all the image frames, but in other exemplary embodiments, the controller 120 may control the image quality processor 110 to perform the detail enhancement function only on a portion of the image frames.

Referring to FIG. 1, it can be seen that an image frame A is input to the image quality processor 110, and an image frame A1 on which the detail enhancement function is performed or an image frame A2 on which the detail enhancement function is not performed is output from the image quality processor 110.

The controller 120 may control whether or not to perform the detail enhancement function in the image quality processor 110. Specifically, the controller 120 may calculate the blur information and the gray information by analyzing the image frame A and determine whether or not to perform the detail enhancement function based on the at least one of the calculated blur information and gray information.

Figure 2:
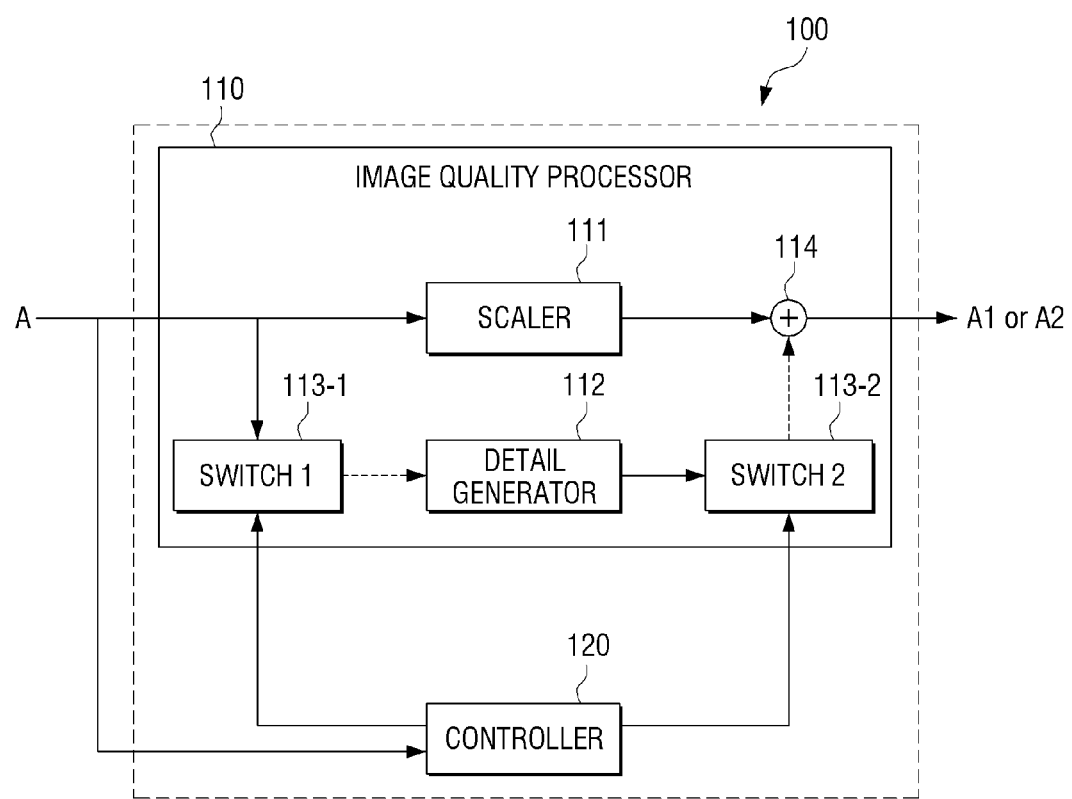
FIG. 2 is a detailed block diagram illustrating a configuration of the image processing apparatus of FIG. 1, according to an exemplary embodiment.

FIG. 2 is a detailed block diagram illustrating a configuration of the image processing apparatus of FIG. 1, according to an exemplary embodiment. Description for a portion of an image processing apparatus 100 in FIG. 2 overlapping that of the image processing apparatus 100 in FIG. 1 will be omitted. Referring to FIG. 2, an image quality processor 110 may include a scaler 111, a detail generator 112, switches 113-1 and 113-2, and an adder 114.

In an exemplary embodiment, the image quality processor 110 of the image processing apparatus 100 may be at least one of a luminance processor configured to perform the detail enhancement function for luminance of an image frame, and a chroma processor configured to perform the detail enhancement function for chroma of the image frame.

First, the example that the image quality processor 110 comprises the luminance processor will be described. The image quality processor 110 may perform the detail enhancement function for the luminance of the image frame. Specifically, in response to luminance data of an image frame A being input as a pixel value, the scaler 111 may perform scaling on the pixel value and output a scaled pixel value.

The detail generator 112 may generate detail to be added to the image frame scaled through the scaler 111. Specifically, in response to the luminance data of the image frame A being input as the pixel value through the switch 113-1, the detail generator 112 may generate the detail to be added to the pixel value scaled through the scaler 111 and output the generated detail.

In this example, the detail may refer to a difference value between an input and an output. That is, for example, in response to the pixel value being input, the detail generator 112 may perform scaling on the pixel value and output the scaled pixel value separately from the scaler 111, and generate a difference between the output pixel value and the input pixel value as the detail and output the generated detail.

As described above, the detail generated from the detail generator 112 may be transferred to the adder 114 through the switch 113-2, added to the pixel value scaled through the scaler 111, and output as the luminance data of the image frame A1 on which the detail enhancement function is performed.

The switches 113-1 and 113-2 may turn on/off the input and output of the detail generator 112 according to control of the controller 120. Specifically, the switches 113-1 and 113-2 may turn on/off the input and output of the detail generator 112 by intactly transferring the luminance data of the image frame input to the scaler 111 to the detail generator 112, and intactly transferring the detail output from the detail generator 112 to the adder 114.

In particular, the switches 113-1 and 113-2 may turn on/off the input and output of the detail generator 112 by setting the luminance data of the image frame input to the detail generator 112 and the detail output to the adder 114 to different values according to control of the controller 120. For example, the switches 113-1 and 113-2 may turn on/off the input and output of the detail generator 112 by setting the luminance data of the image frame input to the detail generator 112 and the detail output to the adder 114 to 0 (zero) even through the luminance data of the image frame input to the scaler 111 and the detail output from the detail generator 112 have a non-zero value.

For example, the switches 113-1 and 113-2 may be implemented with a multiplexer and the like, but this is not limited thereto.

The adder 114 may add an output of the scaler 111 and an output of the switch 113-2 and output the adding result to the outside of the image processing apparatus 100. The adder 114 may be configured to add the pixel value and the generated detail.

In response to the luminance data of the image frame A being input, the controller 120 may calculate the blur information of the image frame A by analyzing the image frame A. For example, the controller 120 may estimate an edge characteristic value and a high frequency characteristic value of the image frame A from the luminance data of the image frame A, and calculate the blur information of the image frame A using the estimated edge characteristic value and high frequency characteristic value.

The poor edge characteristic or high frequency characteristic of the image frame A refers to the blurred image. Therefore, the controller 120 may calculate blur information representing the blur level of the image frame A by indicating the edge characteristic value and high frequency characteristic value in numbers.

In response to a determination that the calculated blur information is equal to or less than the threshold value, that is, the blur level of the image frame A is a certain level or more, the controller 120 may determine that the detail enhancement function is not to be performed. This is because the effect is insignificant when the detail enhancement function is performed in response to the image frame being blurred. The threshold value may be set to a value based on the blur level of the image frame such that the user does not feel a difference between an image on which the detail enhancement function is performed and an image on which the detail enhancement function is not performed.

In response to a determination that the detail enhancement function is not to be performed, the controller 120 may control the switches 113-1 and 113-2 to turn off the input and output of the detail generator 112. Specifically, the controller 120 may turn off the input and output of the detail generator 112 by setting the luminance data of the image frame input to the detail generator 112 and the detail output to the adder 114 to 0 (zero).

In response to the input and output of the detail generator 112 being turned off, since there is no luminance data of the image frame A input to the detail generator 112, the detail generator 112 may not generate the detail. Even in response to noise being input to the detail generator 112 and an arbitrary value being output as the detail, the detail is not output to the adder 114, and an operation of adding the detail to the output of the scaler 111 is effectively not performed.

That is, in response to the blur information calculated through the analysis of the luminance data of the image frame A being equal to or less than the threshold value, the scaling on the luminance data of the image frame A may be performed through the scaler 111, and the scaled luminance data of the image frame A may be intactly output as luminance data of the image frame A2, that is, an image frame on which the detail enhancement function is not performed.

The controller 120 may determine whether or not to perform the detail enhancement function using blur information for a plurality of image frames. The plurality of image frames may be preset. Specifically, the controller 120 may calculate the blur information per an input image frame, and determine whether or not to perform the detail enhancement function by appropriately processing the calculated blur information.

This is because the user may recognize that the detail enhancement function is or is not performed per the image frame. Since the detail enhancement function may be a factor which causes inconvenience in image viewing of the user, the detail enhancement function may be applied by determining whether or not to perform the detail enhancement function per the plurality of image frames.

For example, the controller 120 may calculate final blur information by performing low pass filtering on blur information for N image frames, and determine whether or not to perform the detail enhancement function based on the calculated final blur information.

Hereinafter, an example in which the image quality processor 110 comprises the chroma processor will be described. The image quality processor 110 may perform the detail enhancement function for the chroma of the image frame. The operation of the image quality processor 110 for chroma is the same as the above-described operation of the image quality processor 110 for luminance other than the kind of data, which is input to the image quality processor 110, processed in the image quality processor 110, and output from the image quality processor 110, output as the chroma data of the image frame.

That is, other than the chroma data of the image frame A which is output as chroma data of the image frame A1, which is input to and processed in the image quality processor 110 and which the detail enhancement function is performed thereon, or chroma data of the image frame A2, which is input to and processed in the image quality processor 110 and which the detail enhancement function is not performed thereon, the operations of the scaler 111, the detail processor 112, the switches 113-1 and 113-2, and the adder 114 in the image quality processor 110 for the luminance are the same as those in the image quality processor 110 for the chroma, and thus overlapping description thereof will be omitted.

In response to the chroma data of the image frame A being input, the controller 120 may calculate gray information of the image frame A using pixel values included in a certain region of the image frame A. The certain region may be preset. For example, the controller 120 may calculate the gray information of the image frame A by averaging chroma values of the pixels included in the preset region of the image frame A. The certain region may be experimentally set by a manufacturer of the image processing apparatus 100.

The calculated gray information may represent a low chroma level of a corresponding image frame, that is, a gray level of the corresponding image frame. In response to a determination that the calculated gray information is the specific value, that is, the chroma of the image frame A is low to a certain level or less, the controller 120 may determine that the detail enhancement function is not to be performed. This is because the effect is insignificant when the detail enhancement function is performed in response to the chroma level of the image frame A being low to the certain level or less. The specific value may be set to a value based on the low chroma level of the image frame such that a user does not feel a difference between an image on which the detail enhancement function is performed and an image on which the detail enhancement function is not performed. The specific value may be preset and may have a plurality of values.

In response to a determination that the detail enhancement function is not performed, the controller 120 may control the switches 113-1 and 113-2 to turn off the input and output of the detail generator 112. Specifically, the controller 120 may turn off the input and output of the detail generator 112 by setting the chroma data of the image frame input to the detail generator 112 and the detail output to the adder 114 to 0 (zero).

In response to the input and output of the detail generator 112 being turned off, since there is no chroma data of the image frame A input to the detail generator 112, the detail generator 112 may not generate the detail. Even in response to noise being input to the detail generator 112, and an arbitrary value being output as the detail from the detail generator 112, since the detail is not output to the adder 114, and the adder 114 may effectively not perform an operation of adding the detail to the output of the scalier 111.

That is, in response to the gray information calculated through the analysis of the chroma data of the image frame A being the specific value, the scaling on the chroma data of the image frame A may be performed through the scaler 111, and the scaled chroma data of the image frame A may be intactly output as chroma data of the image frame A2, that is, an image frame on which the detail enhancement function is not performed.

The controller 120 may determine whether or not to perform the detail enhancement function using gray information for a plurality of image frames. The plurality of image frames may be preset. Specifically, the controller 120 may calculate the gray information per an input image frame, and determine whether or not to perform the detail enhancement function by appropriately processing the calculated gray information.

This is because the user may recognize that the detail enhancement function is or is not performed per the image frame. Since the detail enhancement function may be a factor which causes inconvenience in image viewing of the user, the detail enhancement function may be applied by determining whether or not to perform the detail enhancement function per the plurality of image frames.

For example, the controller 120 may calculate final gray information by performing low pass filtering on gray information for N image frames, and determine whether or not perform the detail enhancement function based on the calculated final blur information.

The controller 120 may determine whether or not to perform the detail enhancement function using gray information of an image frame in a YCbCr color space and/or a RGB color space. For example, it may be assumed that each of Y, Cb, and Cr has a 10-bit depth in response to the gray information being calculated in the YCbCr color space. In response to the calculated gray information having a specific value corresponding to low chroma such as YCbCr=(512, 512, 512), the controller 120 may determine that the detail enhancement function is not to be performed. In response to the gray information being calculated in the RGB color space, the operation of determining whether nor not to perform the detail enhancement function based on the gray information may be performed as in the above-described determination operation.

In some exemplary embodiments, the controller 120 may determine whether or not to perform the detail enhancement function by selecting one of the gray information calculated in the YCbCr color space and the gray information calculated in the RGB color space, or by combining the gray information in the YCbCr color space and the gray information in the RGB color space.

In FIG. 2, the example that the switches 113-1 and 113-2 turn off both the input and output of the detail generator 112 has been described. However, the exemplary embodiment is not limited thereto, and in some exemplary embodiments, the switch may be disposed only on one of the input and output sides of the detail generator 112.

Figure 3:
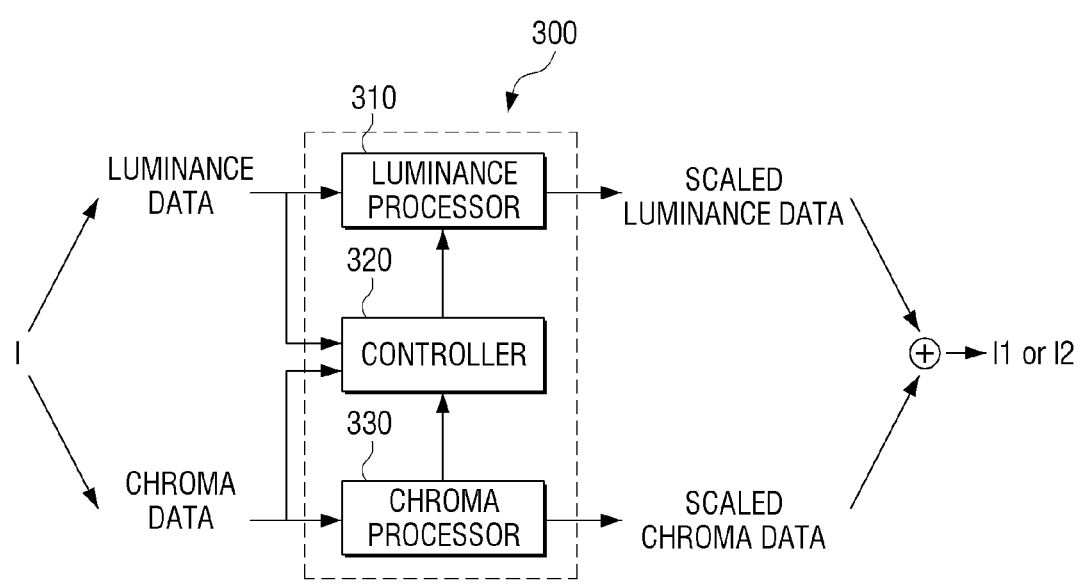
FIG. 3 is a block diagram illustrating a configuration of an image processing apparatus according to an exemplary embodiment.

FIG. 3 is a diagram illustrating an image processing apparatus in which an image quality processor includes both the luminance processor and the chroma processor described in FIG. 2, according to an exemplary embodiment. Referring to FIG. 3, an image processing apparatus 300 may include a luminance processor 310, a controller 320, and a chroma processor 330. The configurations and operations of the luminance processor 310 and the chroma processor 330 are the same as those of the luminance processor and the chroma processor for the image processor 110 described in FIG. 2.

That is, luminance data of an image frame I may be output as luminance data scaled through the luminance processor 310, and chroma data of the image frame I may be output as chroma data scaled through the chroma processor 330.

The scaled luminance data and/or chroma data may be or may not be subject to a detail enhancement function. The scaled luminance data and chroma data processed in and output from the luminance processor 310 and the chroma processor 330, respectively, may be added to be an image frame I1 on which the detail enhancement function is to be performed or may not be effectively added to an image frame I2 on which the detail enhancement function is not to be performed.

Specifically, the controller 320 may calculate blur information by analyzing input luminance data, and calculate gray information by analyzing input chroma data. In response to the blur information being equal to or less than a threshold value or the gray information being a specific value, the controller 320 may control the luminance processor 310 and the chroma processor 330, respectively, not to perform the detail enhancement function. The threshold value and the specific value may be preset. The scaled luminance data and chroma data output from the luminance processor 310 and the chroma processor 330 may not be subject to the detail enhancement function, and then may effectively not be added to be the image frame I2 on which the detail enhancement function is not performed.

On the other hand, in response to the blur information being more than the threshold value and the gray information not being equal to the specific value, the controller 320 may control the luminance processor 310 and the chroma processor 330 to perform the detail enhancement function. The scaled luminance data and chroma data output from the luminance processor 310 and the chroma processor 330 may be subject to the detail enhancement function, and then added to be the image frame I1 on which the detail enhancement function is to be performed.

In some exemplary embodiments, even in response to the blur information being more than the threshold value and the gray information not being equal to the specific value, that is, even in response to a determination that the detail enhancement function is to be performed based on the blur information and the gray information, the controller 320 may control the luminance processor 310 and the chroma processor 330 not to perform the detail enhancement function once per a certain number of image frames. The certain number of image frames may be preset. The certain number of image frames is the number of consecutive image frames which is not recognized by the user even in response to the detail enhancement function being not performed on one image frame while the detail enhancement function on the consecutive image frames is performed. The number of image frames may be experimentally set by a manufacturer of the image processing apparatus 300. In other words, in some exemplary embodiments, the controller 120 may control the image quality processor 110 to perform the detail enhancement function on all the image frames, but in other exemplary embodiments, the controller 120 may control the image quality processor 110 to perform the detail enhancement function only on a portion of the image frames.

In some exemplary embodiments, the image processing apparatuses 100 and 300 described in FIGS. 1 to 3 may be implemented with one chip such as system on chip (SOC). In some exemplary embodiments, the image processing apparatuses 100 and 300 may be configured in a partial configuration of a display apparatus such as a television (TV), a portable phone, an electronic photo frame, a laptop personal computer (PC), a monitor, a desktop PC, or a tablet PC. In such a case, the operations of the controllers 120 and 320 of the image processing apparatuses 100 and 300 may be performed in a component configured to control the display apparatus.

Figure 4:
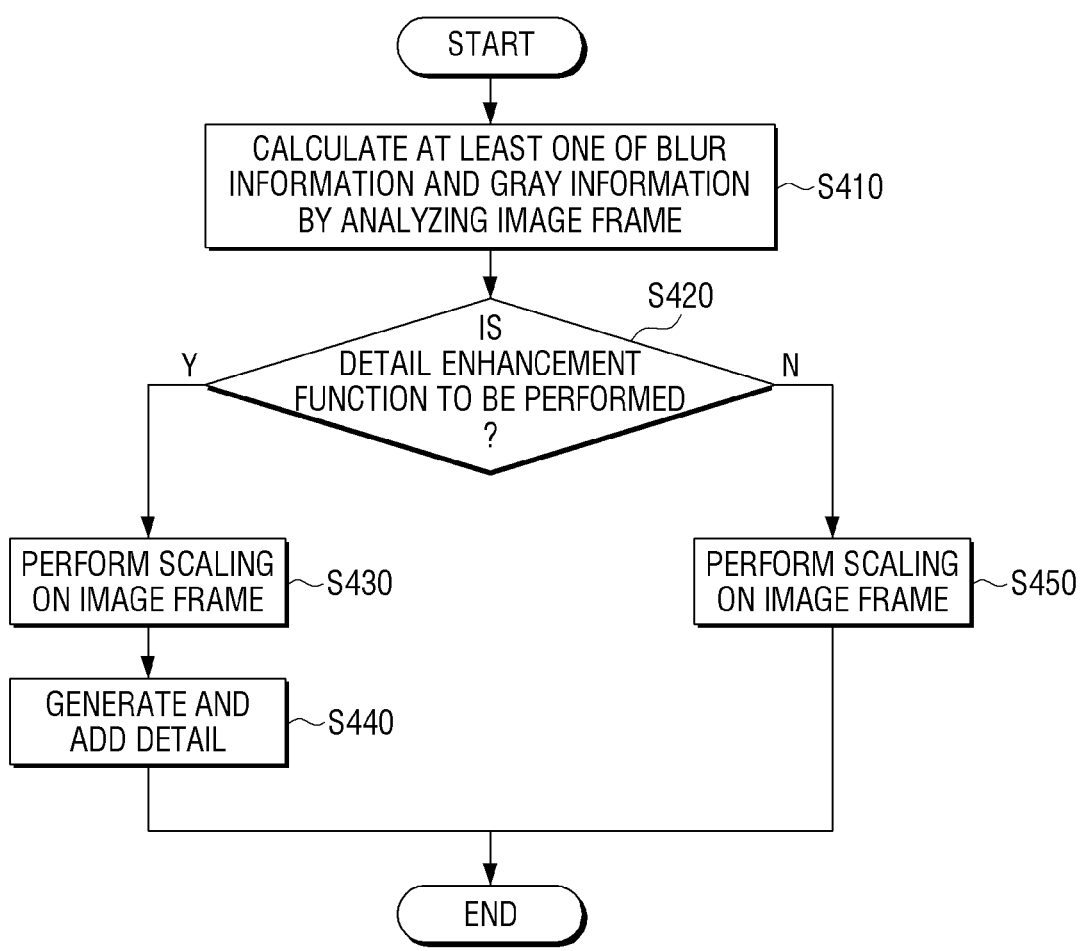
FIG. 4 is a flowchart illustrating a control method of an image processing apparatus according to an exemplary embodiment.

FIG. 4 is a flowchart illustrating a control method of an image processing apparatus according to an exemplary embodiment. The control method of the image processing apparatus in FIG. 4 overlapping the operation described in FIGS. 1 to 3 will be omitted.

Referring to FIG. 4, the image processing apparatuses 100 and 300 may calculate at least one of blur information and gray information of an image frame by analyzing the image frame (S410).

Specifically, in response to the image frame being input, the image processing apparatuses 100 and 300 may calculate the blur information of the image frame using at least one of an edge characteristic value and a high frequency characteristic value of the image frame, and calculate the gray information of the image frame using pixel values included in a preset region of the image frame. The blur information refers to a blur level of a corresponding image frame, and the gray information refers to a low chroma level of the corresponding image frame. The image processing apparatuses 100 and 300 may calculate the blur information and gray information of the corresponding image frame per an image frame.

The image processing apparatuses 100 and 300 may determine whether or not to perform the detail enhancement function on the input image frame based on the at least one of the calculated blur information and gray information (S420).

Specifically, the image processing apparatuses 100 and 300 may determine that the detail enhancement function is not to be performed in response to the calculated blur information being equal to or less than a threshold value or in response to the calculated gray information being equal to a specific value. As an example, the image processing apparatuses 100 and 300 may determine whether or not to perform the detail enhancement function using the at least one of calculated blur information and gray information for a plurality of image frames. As another example, the image processing apparatuses 100 and 300 may determine whether or not to perform the detail enhancement function using gray information calculated in at least one of the YCbCr color space and the RGB color space. As another example, the image processing apparatuses 100 and 300 may determine that the detail enhancement function is not to be performed once per a certain number of image frames even in response to the calculated blur information being more than the threshold value and the calculated gray information not being equal to the specific value.

The detail enhancement function may be at least one of the detail enhancement function for luminance of the image frame and the detail enhancement function for chroma of the image frame.

As another example, the image processing apparatuses 100 and 300 may perform the detail enhancement function on the input image frame according to the determination result in operation S420.

In this example, in response to a determination that the detail enhancement function is to be performed (S420—Y), the image processing apparatuses 100 and 300 may perform scaling on the input image frame (S430), and perform the detail enhancement function by generating a detail to be added to the scaled image frame and adding the generated detail to the scaled image frame (S440).

In response to a determination that the detail enhancement function is not to be performed (S420—N), the image processing apparatuses 100 and 300 may perform scaling on the image frame (S450), and may not generate the detail to be added to the scaled image frame.

According to various exemplary embodiments, the detail enhancement function may not be performed only in response to the detail enhancement function being not advantageous based on a blur level or a gray level of a source image. Therefore, a high definition display apparatus capable of reducing power consumption while the user views a screen may be provided.

The operation of a controller in an image processing apparatus or the control method of the image processing apparatus according to the above-described various exemplary embodiments may be implemented in a program code and provided in a form stored in a non-transitory computer-readable medium. An image processing apparatus mounted with the non-transitory computer-readable medium may execute the control method of the image processing apparatus according to the various exemplary embodiments by executing the program code.

For example, the program code for executing the control method of an image processing apparatus including calculating at least one of blur information and gray information of an image frame by analyzing the image frame, determining whether or not to perform a detail enhancement function based on the at least one of the calculated blur information and gray information, and performing the detail enhancement function on the image frame based on a determination result is stored in the non-transitory computer-readable medium, and executed.

The non-transitory computer-readable medium is not a medium configured to temporarily store data such as a register, a cache, or a memory but an apparatus-readable medium configured to permanently or semi-permanently store data. For example, the above-described various programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

The foregoing exemplary embodiments and advantages are described merely for purposes of example and are not to be construed as limiting the present inventive concept. The exemplary embodiments can be readily applied to other types of devices. Also, the description of the exemplary embodiments is intended to be illustrative only, and not to limit the scope of the claims, and many alternatives, modifications, and variations will be apparent to those skilled in the art.

What is claimed is:

1. An image processing apparatus comprising a chip configured to implement:
   an image quality processor configured to perform a detail enhancement function on an image frame; and
   a controller configured to calculate at least one of blur information and gray information of the image frame and control the image quality processor to perform the detail enhancement function on the image frame based on the calculated information,
   wherein the image quality processor includes:
   a scaler configured to perform scaling on the image frame; and
   a detail generator configured to generate a detail added to the image frame scaled through the scaler
   wherein the image quality processor further includes a switch configured to turn on/off at least one an input and an output of the detail generator, and
   the controller controls the switch to turn off the input and/or output of the detail generator in response to a determination that no detail enhancement function is to be performed.

2. The image processing apparatus as claimed in claim 1, wherein the controller calculates the blur information of the image frame using at least one of an edge characteristic value and a high frequency characteristic value of the image frame, and calculates the gray information of the image frame using pixel values included in a certain region of the image frame.

3. The image processing apparatus as claimed in claim 1, wherein the controller determines that no detail enhancement function is to be performed in response to the calculated blur information being equal to or less than a threshold value or in response to the calculated gray information being equal to a specific value.

4. The image processing apparatus as claimed in claim 1, wherein the image quality processor is at least one of a luminance processor configured to perform the detail enhancement function on luminance of the image frame and a chroma processor configured to perform the detail enhancement function on chroma of the image frame.

5. The image processing apparatus as claimed in claim 1, wherein the controller determines whether or not to perform the detail enhancement function using at least one of blur information and gray information for a plurality of image frames.

6. The image processing apparatus as claimed in claim 2, wherein the controller determines whether or not to perform the detail enhancement function using the gray information calculated in at least one of a YCbCr color space and a RGB color space.

7. The image processing apparatus as claimed in claim 3, wherein the controller determines that no detail enhancement function is to be performed once per a certain number of image frames, in response to the calculated blur information being more than the threshold value and the calculated gray information not being equal to the specific value.

8. A method of controlling an image processing apparatus, the method comprising:
   calculating at least one of blur information and gray information of an image frame;
   determining whether or not to perform a detail enhancement function on the image frame based on the calculated information; and
   performing the detail enhancement function on the image frame based on a result of the determination,
   wherein the performing includes, in response to a determination that the detail enhancement function is to be performed, performing scaling on the image frame and performing the detail enhancement function by generating a detail to be added to the scaled image frame and adding the detail to the scaled image frame, and
   wherein, in response to a determination that no detail enhancement function is performed, generating no detail to be added to the scaled image frame.

9. The method as claimed in claim 8, wherein the calculating includes calculating the blur information of the image frame using at least one of an edge characteristic value and a high frequency characteristic value of the image frame, and/or calculating the gray information of the image frame using pixel values included in a certain region of the image frame.

10. The method as claimed in claim 8, wherein the determining includes determining that no detail enhancement function is to be performed in response to the calculated blur information being equal to or less than a threshold value or in response to the calculated gray information being equal to a specific value.

11. The method as claimed in claim 8, wherein the detail enhancement function is at least one of a detail enhancement function on luminance of the image frame and a detail enhancement function on chroma of the image frame.

12. The method as claimed in claim 8, wherein the calculating includes calculating at least one of blur information and gray information for a plurality of image frames, and
   the determining includes determining whether or not to perform the detail enhancement function using the at least one of the calculated blur information and gray information for the plurality of image frames.

13. The method as claimed in claim 9, wherein the determining includes determining whether or not to perform the detail enhancement function using the gray information calculated in at least one of a YCbCr color space and a RGB color space.

14. The method as claimed in claim 10, wherein, in response to the calculated blur information being greater than the threshold value and the calculated gray information not being equal to the specific value, it is determined that no detail enhancement function is to be performed once per a certain number of image frames.

15. An image processing apparatus as claimed in claim 1, wherein the controller is configured to:
   determine to perform the detail enhancement function when the blur information is greater than a threshold value;
   determine not to perform the detail enhancement function when the blur information is less than or equal to the threshold value; and
   control the image quality processor to add detail information when it is determined to perform the detail enhancement function, and to not add detail information when it is determined not to perform the detail enhancement function.

16. An image processing apparatus as claimed in claim 1, wherein the controller is configured to:
   determine to perform the detail enhancement function when the gray information is not equal to a specific value;

determine not to perform the detail enhancement function when the gray information is equal to the specific value; and control the image quality processor to add detail information when it is determined to perform the detail enhancement function, and to not add detail information when it is determined not to perform the detail enhancement function.

* * * * *